Nov. 3, 1970 F. R. CORWIN 3,537,881

LOW TEMPERATURE METHOD FOR IMPROVING THE BONDING OF VAPOR PLATED METALS

Original Filed June 14, 1965

INVENTOR.
FRANK R. CORWIN
BY
Shenier & O'Connor
ATTORNEYS 3,537,881

LOW TEMPERATURE METHOD FOR IMPROVING THE BONDING OF VAPOR PLATED METALS

Frank R. Corwin, Bethlehem, Conn., assignor to United Aircraft Corporation, East Hartford, Conn., a corporation of Delaware Continuation of application Ser. No. 463,631, June 14, 1965. This application Nov. 13, 1968, Ser. No. 775,555
Int. Cl. B44d *1/02;* C23c *13/04*
U.S. Cl. 117—71 9 Claims

ABSTRACT OF THE DISCLOSURE

A method of vapor plating the surface of a first metal with a second metal in which a third metal, which alloys with both of the first and second metals, first is partially diffused into the surface of the first metal at about room temperature and then the surface is exposed to a vapor containing the second metal while the surface is maintained at an elevated temperature which is sufficiently high that the second metal from the vapor diffuses into the third metal.

This application is a continuation of my copending application Ser. No. 463,631, filed June 14, 1965, now abandoned.

My invention relates to vapor plating and more particularly to a method for improving the bonding of vapor plated metals by employing an initial low temperature step.

The term "vapor plating" describes several similar but distinct plating processes. One type of vapor plating employs chemical processes carried out by reducing or by decomposing a volatile compound of the plating material at the surface which is to be plated. Another type of vapor plating employs a physical process carried out by vaporizing a metal in a high vacuum and permitting it to condense on the surface which is to be plated.

Some vapor plated metals do not satisfactorily bond to the substrates they coat. It is known in the prior art that in certain of these instances the bonding can be improved by heating the plated specimen to an elevated temperature. In many instances, however, the temperature required to improve the bonding is higher than the plated specimen or a component associated therewith can withstand without harmful effects.

Specifically, in the prior art, the bond between nickel deposited from nickel carbonyl $Ni(CO)_4$ vapor and a copper surface is unsatisfactory. Examinations of copper specimens which have been plated by this vapor plating process show that the bond is only mechanical and that there is an interface between the plated nickel and the copper. Post-plating heat treatment has been used in the prior art to effect the bonding. Heating the nickel-plated copper specimen to about 315° C. for about 30 minutes increases the strength of the nickel-copper bond.

Many of the copper specimens which must be plated with nickel are associated with components of semiconductor material and the like. Most of these components can withstand temperatures of 150° C., which is required for forming the nickel plate. These components, however, often cannot satisfactorily tolerate temperatures in the neighborhood of 315° C., so that the post-plating heat treatment cannot be used to improve the nickel-to-copper bond.

I have invented a method for improving the bonding of vapor deposited metals without deleteriously affecting either the carrier specimen or the components associated therewith, by employing an initial low temperature step in the process.

One object of my invention is to provide a low temperature method for improving the bonding of vapor deposited metals.

Another object of my invention is to provide a low temperature method for improving the bonding of vapor deposited metals to surfaces which are irregular.

An additional object of my invention is to provide a low temperature method of producing diffusion bonds between metals deposited from metallic vapors such as nickel carbonyl, iron carbonyl, chromium carbonyl, or tri-isobutyl-aluminum gas, tungsten hexa-fluoride gas, tantalum pentachloride vapor, silicon tetra-iodide vapor or the like and the surfaces they plate.

A further object of my invention is to provide a low temperature method of forming strongly bonded metallic plate on a surface of a different metal carried by a component such as a semiconductor component or the like which cannot withstand high temperatures.

Other and further objects of my invention will appear from the following description.

In general my invention contemplates the provision of a vapor plating process in which I initially wet or alloy the surface of a specimen of one metal at a low temperature with a metallic wetting agent which will also wet or alloy with a subsequently vapor or gas deposited coating of a different metal.

In the accompanying drawings which form part of the instant specification and which are to be read in conjunction therewith and in which like reference umerals are used to indicate like parts in the various views.

Figure 1:
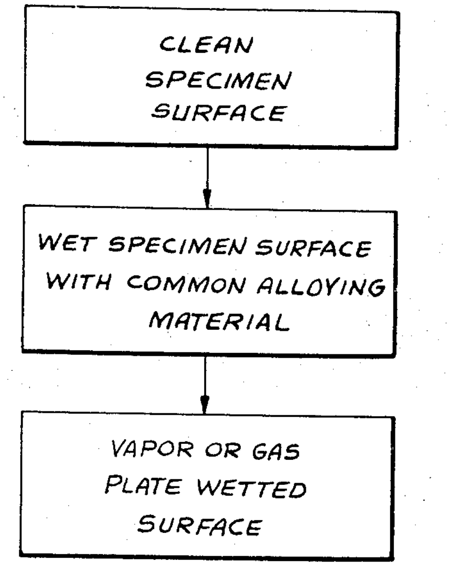
FIG. 1 is a diagram outlining the sequential steps of my new vapor plating method.
Figure 2:
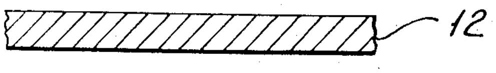
FIG. 2 is a fragmentary sectional view of a metallic specimen to be plated.
Figure 3:
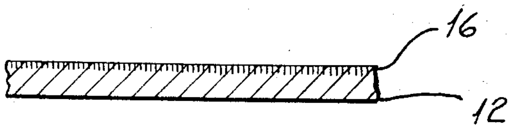
FIG. 3 shows the metlalic specimen of FIG. 2 after it has been wet or alloyed with a metallic wetting agent.
Figure 4:
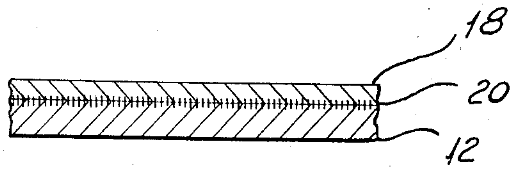
FIG. 4 shows the metallic specimen of FIG. 3 after a metallic coating has been vapor plated thereon.

More particularly referring to the drawings, I prepare the surface of metallic specimen 12 for vapor plating by first cleaning it. The specimen 12 may be a metallic conductor carried by a semiconducting substrate (not shown). I prefer cleaning the specimen 12 mechanically with a fine abrasive in any manner known to the art, since a slightly roughened surface is preferable in carrying out my invention. I then rinse the surface with a suitable cleaning agent such as distilled water or the like, following which I dry the surface with a current of heated inert gas. It will be appreciated by those skilled in the art that the degree of cleanliness necessary depends upon the metal and technique used for wetting. Wetting of one metal by another is a complex phenomenon related to the surface energies of the metals and other factors. It involves at least a partial alloying or diffusion of one metal with or into the other. Any film, dirt, grease, or other contaminant on the surface to be wet can alter these relations and result in one metal failing to wet another. When one metal has satisfactorily wet another there will be a region 16 where the wetting metal has partially diffused into or alloyed with the specimen 12.

Mercury is one example of a satisfactory wetting agent since it can be made to wet most metals at room temperature. Gallium, indium, tin, a eutectic alloy of gallium and indium, and gold are other examples of wetting agents which can be used for wetting when either the specimen surface or the plating metal will not form a suitable amalgam.

There are several methods which are satisfactory for causing the wetting agent to wet the surface of the specimen at low temperatures. Merely immersing certain specimens in a suitable wetting agent is sometimes satisfactory, as for example galvanizing iron. Soldering techniques can be used to wet certain specimens with tin. Gallium can be made to wet most metals by mechanically rubbing their clean surfaces together. In certain instances electrolytic deposition or evaporation techniques can be used. A satisfactory method for wetting, when applicable, is to immerse the specimen in an ionized solution of a wetting agent which is less positive electro-chemically than the specimen.

After wetting the surface of the specimen with a suitable wetting agent, I vapor or gas plate a coating 18 on the wetted surface using a vapor or gas plating process known in the art which is suitable for forming the desired coating.

I have satisfactorily wet zinc specimens with copper by placing the zinc specimen in a solution of copper chloride containing free hydrochloric acid. The more electrochemically positive metal zinc replaces the copper ions in solution, wetting the zinc surface with copper. After wetting the surface with copper, I have vapor plated a chromium coating on the wetted surface by the pyrolysis of chromium carbonyl vapor. This process is well known in the art and it and other processes are described in detail in the book "Vapor Plating" by Powell, Campbell and Gronsor, published by Wiley, New York, 1955.

I have satisfactorily wet copper surfaces with mercury to improve the bonding of vapor plated nickel. In one method of wetting copper with mercury I first immerse the copper in a solution of 1:1 nitric acid (1 gram of dissolved mercury per 100 ml. of acid). The more positive metal, copper, replaces the mercury ions in the solution, wetting the copper surface with mercury. When the bright silvery colored mercury appears on the copper surface, I remove the specimen and rinse it first with distilled water and then with absolute alcohol. I allow the specimen to dry before proceeding with the plating process.

Silver and gold surfaces can also be advantageously wet with mercury by immersing them in a 1:1 nitric acid solution to improve the bonding of a nickel plate which is subsequently vapor plated thereon.

I have also wet copper, silver, and gold specimens in the laboratory by immersing their clean surfaces in liquid mercury.

After wetting the copper surface with mercury I have satisfactorily plated it with nickel by the thermal decomposition of nickel carbonyl vapor. This vapor plating process is well known in the art and is described in detail in and article entitled, "Metal Plating From Carbonyl Gases" in Chemical Engineering, vol. 56, No. 10 (1949), pp. 118–119. Briefly, in the process I use I place the wetted copper surface in a vaportight chamber and heat it to about 150° C. Away from the chamber, I form a nickel carbonyl vapor and cause it to flow into the chamber at a temperature below 150° C. The nickel carbonyl vapor decomposes at the heated copper surface, depositing a coating of nickel thereon.

After the desired thickness of metal plate has formed, I find that it is advantageous to exhaust all the vapors from the chamber while maintaining the temperature of the copper surface at 150° C. for an additional period of about 20 minutes, which allows completion of the diffusion bonding of the plated nickel and the wetted copper surface. The period of time that the plating temperature should be maintained after plating is completed for best results varies from about 15 to 30 minutes, depending upon the amount of wetting metal retained by the specimen surface. In general, the more wetting metal retained by the surface, the greater the depth to which the deposited plating metal will diffuse, and the longer the plating temperature should be maintained for best results. Examination of a specimen that I have plated by my novel process reveals a plate 18 which cannot be separated from the surface of the specimen 12. There is no interface between the vapor deposited plate and the specimen surface but rather a diffused layer of plated and plating material 20 inseparably bonding the plate to the specimen.

It should be noted that my new method can also be advantageously used for vapor plating surfaces which are irregular in shape. Such surfaces are difficult to vapor plate by processes of the prior art because at the temperature required for satisfactory bonding with prior art techniques the coating tends to form away from surfaces that are not on a line of sight with the vapor source, resulting in an unsatisfactory plate. Using my new method lower plating surface temperatures can be used and a satisfactory bond still is produced. These lower temperatures allow the plating vapor to reach the irregular surface areas at a satisfactory temperature for plating.

By way of example, and not by way of limitation, in practicing my method I first clean the specimen surface and then wet it at a low temperature with a metal or alloy which will also wet the metal which is to be plated thereon. I vapor plate a metallic coating on the wetted surface using conventional techniques known in the prior art, forming a plate which is strongly bonded to the surface of the specimen.

Thus it will be seen that I have achieved the objects of my invention. I provide an initial low temperature step that improves the bonding of vapor deposited metals to a metal substrate of a different metal. Metal plates deposited from carbonyl vapors strongly bond to the surfaces they plate when applied in accordance with my new method. With my method copper conductors can be plated with a strongly bonded coating of nickel.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described by invention, what I claim is:

1. A method of vapor plating the surface of a specimen of a first metal with a second metal including the steps of first applying to the surface of said specimen a third metal which alloys with said specimen at about room temperature and with said second metal at an elevated temperature appreciably above room temperature and below about 350° C., then partially diffusing said third metal into said surface at about room temperature, then exposing said surface to a plating vapor bearing said second metal and then maintaining said specimen at an elevated temperature appreciably above room temperature and below a temperature in the neighborhood of about 315° C. at which said second metal diffuses into said third metal to form a coating of said second metal on said surface.

2. A method as in claim 1 in which said specimen is copper and in which said plating vapor is nickel carbonyl.

3. A method as in claim 1 in which said third metal is mercury.

4. A method as in claim 1 in which said specimen is copper and in which said second metal is nickel.

5. A method as in claim 1 in which said specimen is copper, said second metal is nickel and said third metal is mercury.

6. A method as in claim 1 in which said specimen is copper, said third metal is mercury and said plating vapor is nickel carbonyl vapor.

7. A method as in claim 1 in which said elevated temperature is in the region of 150° C.

8. A method as in claim 1 in which said step of partially diffusing said metal comprises immersing said specimen in a solution containing said third metal.

9. A method as in claim 1 in which said specimen is copper, said third metal is mercury, said plating vapor is nickel carbonyl vapor and in which said elevated temperature is in the region of 150° C.

References Cited

UNITED STATES PATENTS

| | | | |
|---|---|---|---|
| 1,566,984 | 12/1925 | Shoemaker | 29—196.3 |
| 2,547,465 | 4/1951 | Heintz et al. | 29—196.3 X |
| 2,700,623 | 1/1955 | Hall. | |
| 2,867,546 | 1/1959 | MacNevin | 29—199 X |

OTHER REFERENCES

C. E. Dull, H. C. Metcalfe, J. E. Williams, Modern Chemistry, Henry Holt and Company, New York, 1958, p. 535.

ALFRED L. LEAVITY, Primary Examiner

C. K. WEIFFENBACH, Assistant Examiner

U.S. Cl. X.R.

29—196, 197, 199; 117—107.2, 131